United States Patent
Carter et al.

(10) Patent No.: US 7,469,408 B2
(45) Date of Patent: Dec. 23, 2008

(54) DOCUMENT CUSTOMIZATION FOR TRANSPARENT EXECUTION ON A CLIENT AND A SERVER

(75) Inventors: Eric H. Carter, Kirkland, WA (US); Andrew J. Clinick, Issaquah, WA (US); Robert E. Lippert, Seattle, WA (US); Mohit Gupta, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 755 days.

(21) Appl. No.: 10/779,511

(22) Filed: Feb. 13, 2004

(65) Prior Publication Data
US 2005/0183001 A1 Aug. 18, 2005

(51) Int. Cl.
G06F 9/44 (2006.01)
(52) U.S. Cl. ............... 719/310; 719/328; 715/200; 715/235
(58) Field of Classification Search ............... 719/310, 719/315, 316, 328; 715/513, 526, 200, 205, 715/210, 212, 234, 235, 236, 246; 707/1; 709/203, 217
See application file for complete search history.

(56) References Cited

U.S. PATENT DOCUMENTS

| | | | |
|---|---|---|---|
| 5,842,018 A | 11/1998 | Atkinson et al. | |
| 5,903,905 A * | 5/1999 | Andersen et al. | 715/526 |
| 5,995,756 A * | 11/1999 | Herrmann | 717/178 |
| 6,167,441 A * | 12/2000 | Himmel | 709/217 |
| 6,189,000 B1 * | 2/2001 | Gwertzman et al. | 707/1 |
| 6,195,696 B1 * | 2/2001 | Baber et al. | 709/223 |
| 6,263,379 B1 | 7/2001 | Atkinson et al. | |
| 6,345,293 B1 * | 2/2002 | Chaddha | 709/219 |
| 6,449,659 B1 | 9/2002 | Caron et al. | |
| 6,492,995 B1 * | 12/2002 | Atkin et al. | 715/703 |
| 6,571,285 B1 * | 5/2003 | Groath et al. | 709/223 |
| 6,635,089 B1 | 10/2003 | Burkett et al. | |
| 6,650,344 B1 | 11/2003 | DiTommaso et al. | |
| 7,149,964 B1 * | 12/2006 | Cottrille et al. | 715/513 |

(Continued)

OTHER PUBLICATIONS

G.H. Ter Hofte and H.J. Van Der Lugt. CoCoDoc: A framework for collaborative compound document editing based on OpenDoc and CORBA. In Proceedings of the IFIP/IEEE international conference on open distributed processing and distributed platforms, 1997. 19 pages.

(Continued)

*Primary Examiner*—Van H Nguyen
(74) *Attorney, Agent, or Firm*—Amin, Turocy & Calvin, LLP

(57) ABSTRACT

Architecture that facilitates the creation of a customized document with embedded or linked code that can be run on a client or a server without invoking the host application. A programming model makes it transparent to the code whether it is running on the client or the server. The programming model automatically "scales" to provide more features while running the document on the client and fewer features when running on the server. A transparent data island is automatically generated for the customized document that is embedded in the document and can be edited while requiring only a subset of all components of the host application to be running. A data binding mechanism is provided wherein changes that are made to the transparent data island while the host is not running can be moved back into the host document content when the document is reopened by the full host application.

16 Claims, 6 Drawing Sheets

U.S. PATENT DOCUMENTS

2003/0041180 A1* 2/2003 Schlussman ............... 709/328
2003/0233483 A1* 12/2003 Melchione et al. .......... 709/310

OTHER PUBLICATIONS

J.C. Grundy, W.B. Mugridge, and J.G. Hosking. Constructing component-based software engineering environments: issues and experiences, Journal of Information and Software Technology, vol. 42, No. 2, pp. 117-128, 2000.

J.C. Grundy. Human Interaction Issues for User-configurable Collaborative Editing Systems, In Proceedings of APCHI'98, IEEE CS Press, pp. 145-150, 1998.

* cited by examiner

US 7,469,408 B2

DOCUMENT CUSTOMIZATION FOR TRANSPARENT EXECUTION ON A CLIENT AND A SERVER

TECHNICAL FIELD

This invention is related to the creation and processing of customized documents in a client/server environment.

BACKGROUND OF THE INVENTION

Certain applications are designed to be "host" applications, in that, users can customize the applications, and build solutions or other applications on top of them. Examples include spreadsheet and word processing applications. In the past, customized documents that had code embedded could only run or be manipulated on the client and required the full host application to be running. In a server situation, starting an application such as the spreadsheet or word processing applications can dramatically slow performance and create resource issues.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises a system that facilitates the creation of a customized document with embedded or linked to code that can be run on the client inside of the host application (e.g., a word processing or spreadsheet application) or run on the server without invoking the host application. Thus, not only is the code agnostic as to where it is executing, it can actually execute with or without invoking the host application, as appropriate, leading to, for example, great performance gains.

In yet another aspect thereof, the programming model automatically "scales" to provide more features while running on the client and less features when running on the server.

In still another aspect of the invention, a transparent data island is automatically generated for the customized document that is embedded in the document and can be edited while requiring only a subset of all components of the host application to be running or no components of the host need run on the server at all.

In another aspect thereof, a mechanism is provided that facilitates data binding whereby changes that are made to the transparent data island while the host is not running can be moved back into the host document content when the document is reopened by the full host application.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
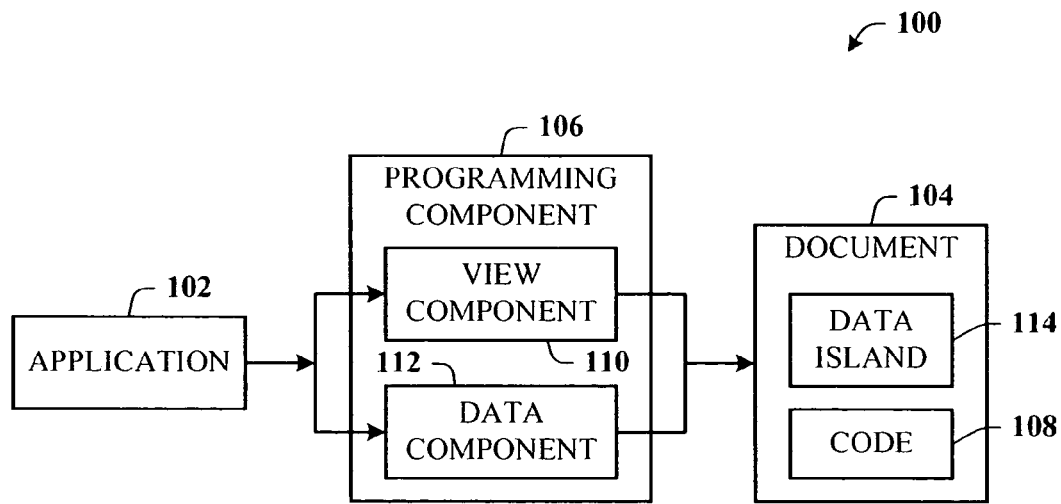
FIG. 1 illustrates a block diagram of a system of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Referring now to FIG. 1, there is illustrated a block diagram of a system 100 of the present invention. The system includes a host application 102 that is used to create a customized document 104. The host application 102 can be a word processing application, or a spreadsheet application, for example. A programming component 106 interfaces to the host application 102 to facilitate at least embedding the code 108 in the document 104. The embedded code 108 facilitates running of the document 104 in the client application and/or the server application by requiring only a subset of all components of the host application 102. Alternatively, the code can be linked to by the document and can be stored outside the document.

In the past, the only option a programmer (or developer) had when developing a customized document was to write code against a generic API (Application Program Interface) provided by the host application 102. The present invention generates view and data programming models that conform to schemas provided by the developer. In support thereof, the programming component 106 includes both a view component 110 and a data component 1112. The programming component 106 facilitates separating document view elements (or content) from document data (or data elements). Thus, the data component facilitates the automatic creation of a data island 114 in the customized document 104. The data in the data island 114 can be edited without requiring the host application 102 to be fully operational. That is, only a subset of the application components needs to be activated to edit the data.

The customized document 104 can then be run on the client inside the host application 102 or on the server without invoking the host application 102. Thus, not only is the embedded code agnostic as to where it is executing, it can actually execute with or without invoking the host application, as appropriate, leading to, for example, great performance gains. The programming model makes it transparent to the embedded code whether it is running on the client or the server.

Figure 2:
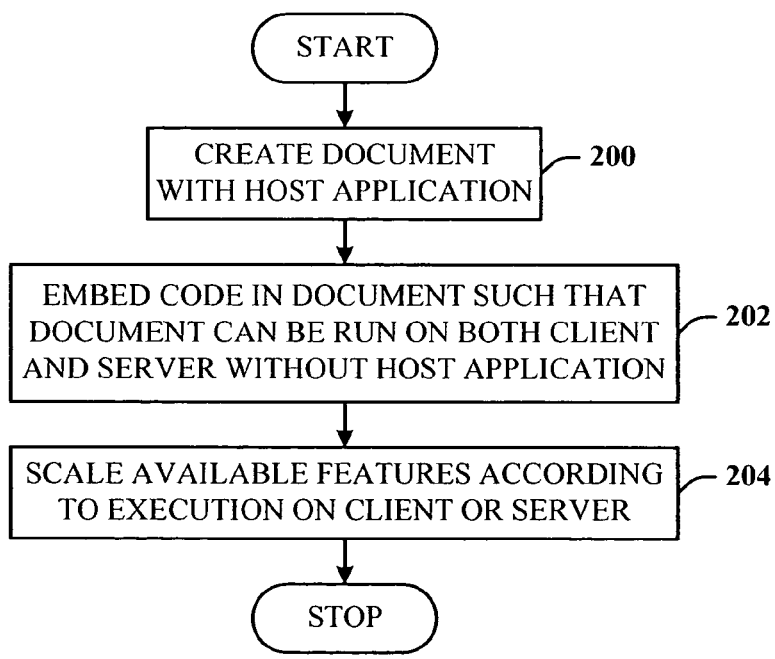
FIG. 2 illustrates a flow chart of a process of code embedding of the present invention.

Referring now to FIG. 2, there is illustrated a flow chart of a process of code embedding of the present invention. Though, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 200, the user/developer creates a document using the host application. At 202, the programming facilitates embedding code in the document such that the document can be run on the client and the server without invoking the host application. At 204, the programming model adds scaling capability such that the available features scale according to whether the document is run on the client or the server. The process then reaches a Stop block.

Figure 3:
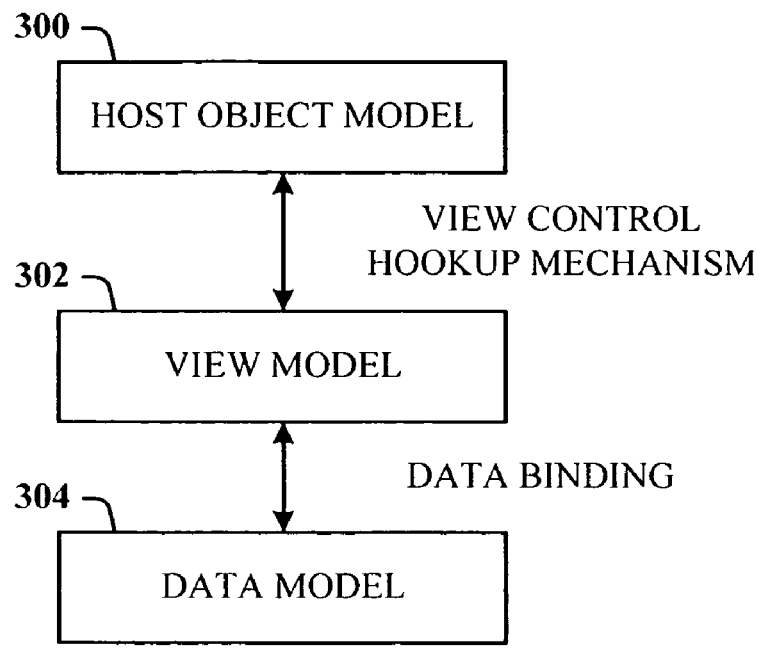
FIG. 3 illustrates a block diagram of a relationship of the host, view and data models, in accordance with the present invention.

Referring now to FIG. 3, there is illustrated a block diagram of a relationship of the host, view and data models, in accordance with the present invention. The host object model 300 is available for host compatibility and control. The programming component of the present invention separates the document contents into data content and view content using the corresponding data and view components (or models). The view model 302 (similar to the view component 110) interfaces to the host model 300 via a view control hookup mechanism. The data model 304 (similar to the data component 112) interfaces to host object model 300 through the view model 302 via data binding to the view model 302. The view model 302 and data model 304 are schema models specific to the application being created. The customization code can choose to not invoke the "view" manipulating code on the server. The "data" manipulating portion of the customization code does not know or care whether it is running on the client or the server. The following sample code illustrates the relationships for each.

Host Model

Dim w as Worksheet
w = ThisWorkBook.Sheets (2)

-continued w.Range("$F$11").Value2 = 12345
View Model

CustomerIDCell.Value2 = 12345
CustomerIDCell.Font.Bold = True
Data Model

Customer.ID = 12345
Customers[0].FirstName = "John"

Following is sample code that illustrates the relationship between the view model 302 and the host object model 300.

ExpenseReportView.Customer.ID.Font.Name

The code "ExpenseReportView.Customer. ID" is the portion generated from user-defined schema. The period (.) after "ID" is the connection between the generated view model to the correct host object model object made by using the schema to the host view element mapping information. The code "Font.Name" is a property provided by the spreadsheet application specific object model. Font is a property of the Range object that represents a cell.

Figure 4:
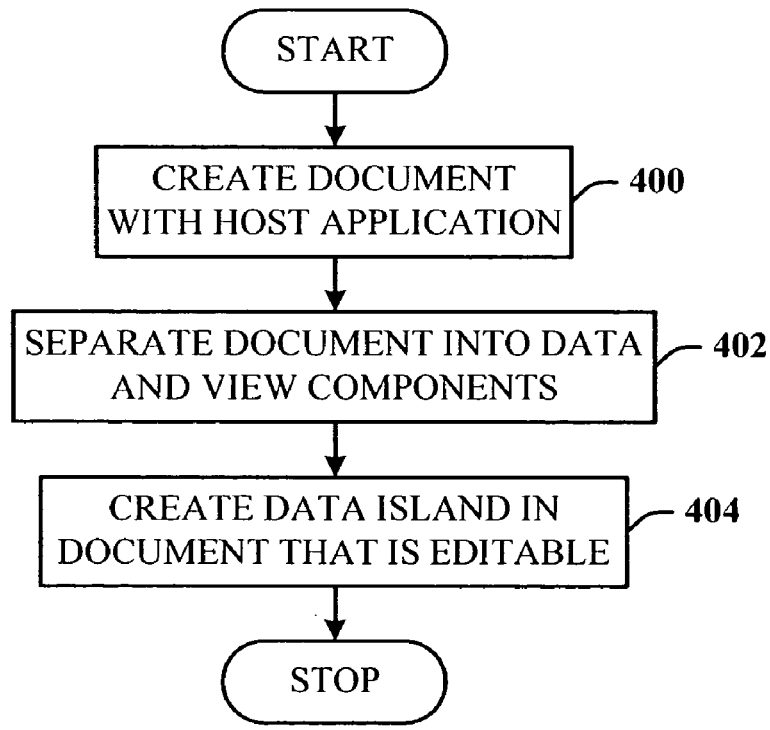
FIG. 4 illustrates a flow chart of creating a data island in accordance with the present invention.

Referring now to FIG. 4, there is illustrated a flow chart of the creating a data island in accordance with the present invention. At 400, the document is created using the host application. At 402, the contents of the document are separated into view content and data content. At 404, a data island of the data content is automatically created in the document. The data in the data island is accessible by both the host application running on the client or by the server. The data island can be edited while requiring only a subset of all components of the host application to be running. The process then reaches a Stop block.

Figure 5:
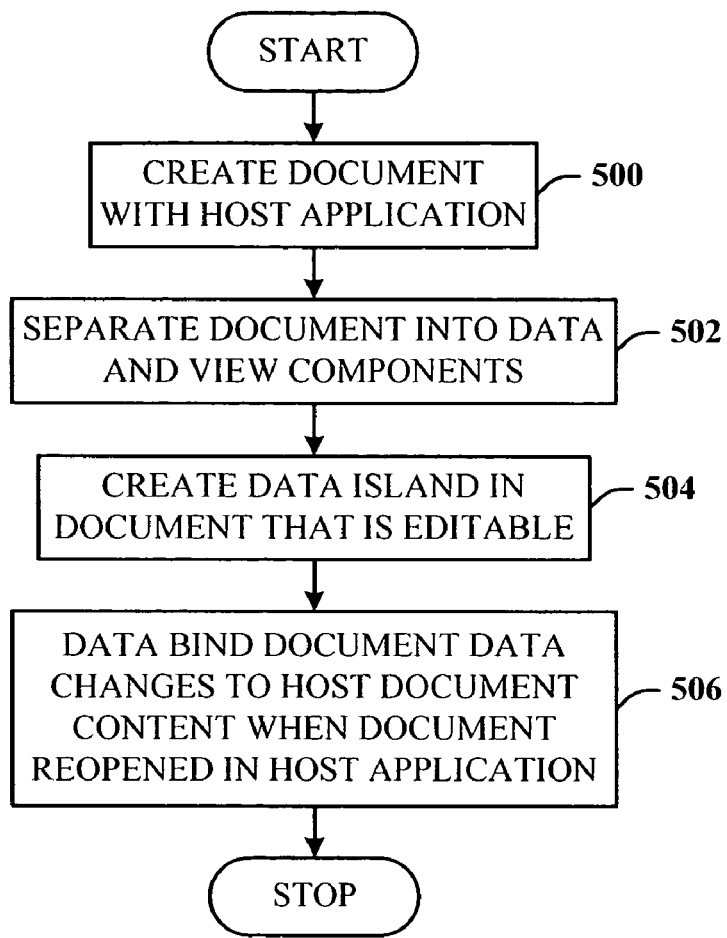
FIG. 5 illustrates a flow chart of data binding in accordance with the present invention.

Referring now to FIG. 5, there is illustrated a flow chart of data binding in accordance with the present invention. At 500, the document is created using the host application. At 502, the contents of the document are separated into view content and data content. At 504, a data island of the data content is automatically created in the document. At 506, the document data changes are bound to the host document content when the document is reopened by the full host application. The process then reaches a Stop block.

Some interesting scenarios enabled by code running on the client or server include the scenario where some code is embedded in a spreadsheet document. When the spreadsheet document is posted to a server site for sharing or access, the embedded code can execute and perform interesting tasks without requiring start of the spreadsheet application (which would require the spreadsheet application to be running on the server). The spreadsheet could be exposed as a web service. A runtime program could execute just the embedded code associated with that spreadsheet document, and run it on the server to field web service requests. Data contained in a spreadsheet data island can be exposed out to web pages and other views, all without starting the host application. The present invention allows the same code to run on the client or server against the embedded data island that is automatically created in the document.

Feature Scaling Between Client and Server

The generated programming model for the document scales between use on a client and a server. That is, the model runs in a lower functionality on the server than on the client. This reduction in functionality is transparent to the code being written. This transparency is enabled by combining several techniques.

Figure 6:
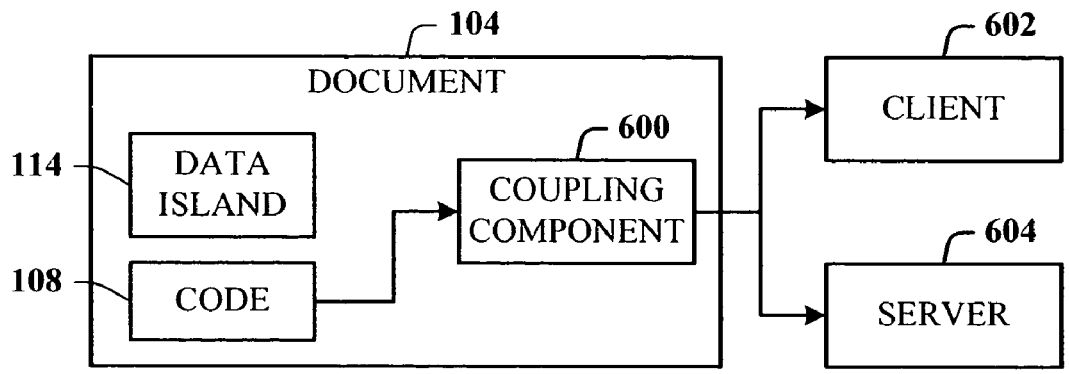
FIG. 6 illustrates a block diagram for scaling in accordance with the present invention.

Referring now to FIG. 6 there is illustrated a block diagram for scaling in accordance with the present invention. The document 104 includes both the data island 114 and the embedded code 108. Separate from the embedded code 108 or as part of the embedded code 108, there is provided a coupling component 600 that facilitates scaling the features for running the document on a client 602 and/or a server 604. Thus, if the coupling component 600 determines that the document 104 is being launched from the client 602, scaling-up is provided where coupling will occur at least between the data model and the view model to provide increase functionality for accessing and processing both view and data elements of the document 104. On the other hand, if the coupling component 600 determines that the document 104 is being executed on the server 604, a scaling-down effect is imposed to reduce functionality which is provided by, in one embodiment, not coupling the data model to the view model. In another embodiment, if the server 602 includes a lightweight API (which does not involve starting the entire host application) that provides limited capabilities of the host application such as limited access to a view model, the data model will be coupled to the view model to allow view access.

Figure 7:
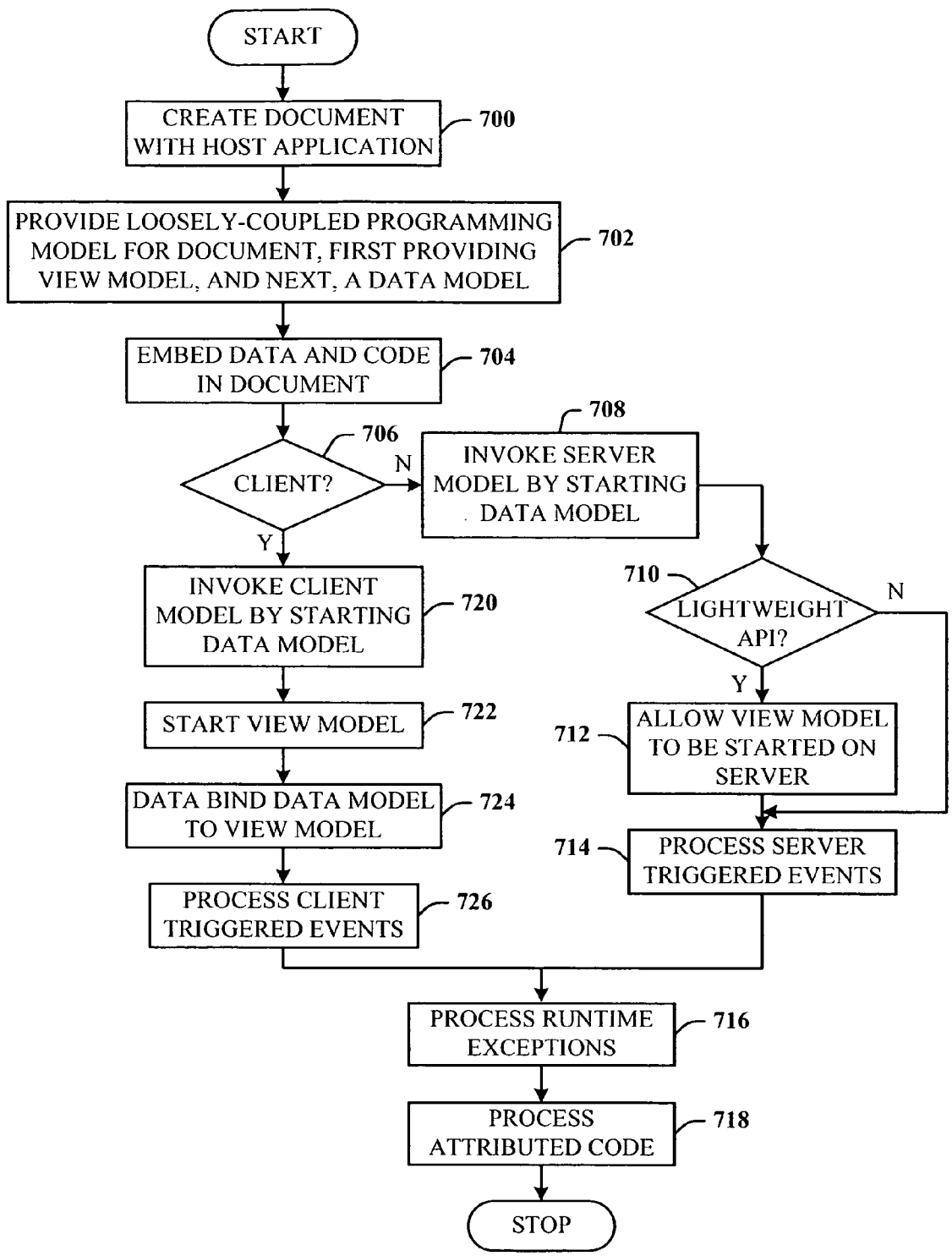
FIG. 7 illustrates a flow chart of a scalable feature in accordance with the present invention.

Referring now to FIG. 7, there is illustrated a flow chart of a scalable feature in accordance with the present invention. At 700, a document is created using the host application. At 702, a loosely coupled programming model is generated for the document by separating the document into a view model and a data model.

In the past, the only option a programmer had when developing a customized document was to write code against the generic general purpose API provided by the host application. The view and data programming models of the present invention conform to schemas provided by the developer. For example, the developer may have a spreadsheet that contains an ID associated with a customer. Assume that this ID is located in Column A, Row 2, and the developer wants to set its value to "12345". Traditionally, the generic way for the spreadsheet API to talk to that ID is writing code such as the following.

Workbook.Sheets(1).Range("$A$2").Value=12345

The present invention provides a schema for Customer and a mapping from Customer.ID to its actual location in the spreadsheet. Thus, two additional generated programming models are provided that give the developer a schema-oriented way to talk to the ID in the spreadsheet, and that are easier to understand and use domain names provided by the developers.

First, the view model gives a programmable name to generic API objects and exposes these objects out as "view controls" that can be easily discovered and against which they can be easily programmed. The view model way of changing the customer ID looks as following.

CustomerIDCell.Value=12345

With the view model, the developer can also write code to change other attributes of the cell that are not data specific, but are view specific. For example:

```
CustomerIDCell.Value = 12345
CustomerIDCell.BackColor = Green
CustomerIDCell.Width = 100
```

Second, the data model only allows the developer to change the data of interest in the document. The data model way of representing the customer ID is as follows.

Customer.ID=12345

The data model acts indirectly against the view via data binding. All three models—the host API, the view model, and the data model—are loosely coupled. This results in three separate loosely coupled programming models as shown in FIG. 3. At 704, the data and code are then embedded in the document.

A second reason for code transparency is that the three programming models (Host, View, and Data) are loosely coupled and can be started up independently of one another. This is important to code transparency by enabling execution of the document regardless of where it will be processed, on the client and/or on the server. At 706, the system determines if the document will be run on the client. If not, flow is to 708 to invoke the server model of the embedded code. On the server, in most cases, only the data programming model is started. No coupling is initiated between the data model and the view model using data binding because doing so would require the host application to execute. However, at 710, if the system determines that a lightweight API for the view model exists on the host that can be connected to on the server that possibly acts against the document contents without starting up the full host, the present invention provides a mechanism to start the view model on the server against lighter weight, but interface equivalent, objects, as indicated at 712.

The independent startup of programming models is made possible by indirection built in-between each programming model. The data model is hooked to the view model by data binding. The view model is hooked to the host API via a view control hookup mechanism. These points of coupling are intentionally loose and flexible enabling variation in how much of the programming model is available on both the client and the server. Independent startup is also made possible by having two standard entry points for our document customizations—a "CreateForClient" and "CreateForServer". These entry points configure the programming model differently depending on if the programming model is being started on the server or the client.

A third feature that supports code transparency is that the code is data centric. Code written against the data component runs equally well on the client or the server. The more code the developer writes against the data model, the better the capability the document will have to run on the client and the server.

A fourth feature that supports code transparency for scalability is that programming is event centric. Code runs in response to a particular triggering event. On the client, some triggering events include a double-click event or a right-click event. Traditionally, code written against these types of events typically use features only available when the entire host application and all three programming models are running. On the server, the double-click event will not trigger because it is an event that only triggers on the client. Therefore, code will not be run that requires the view or host API programming models. On the server, a separate set of triggering events occurs that can be handled. Code written to handle these events must be written against the data programming model, as that potentially will be the only programming model that starts on the server. In support thereof, at 714, the system processes server-triggered events.

A fifth feature that supports code transparency for scalability is that of runtime exceptions. At runtime, certain parts of the programming model (the view and the host API's) are not guaranteed to be hooked up. If code written against these parts of the programming model is run on the server, a runtime exception will occur that helps the developer discover the parts of the program that need to be rewritten using the data programming model or changed so it will not be run on the server.

A sixth feature that supports code transparency for scalability is that of limited user interface (UI) permissions on the server. In addition to the attempt to access the view-programming model on the server, the developer might attempt to display other UI such as dialog boxes. This is not desirable on the server. For this reason, permission to the customized document is restricted when it is running on the server, to not allow UI to be displayed. Doing so will result in a runtime exception. At 716, runtime exceptions are processed, including those for UI permissions.

A seventh feature that supports code transparency for scalability is that of client/server attributing. Sometimes, it may be impossible to have the same data code run on the client and server. For example, the resources available on the client may be different from the resources available on the server. The client may not have a local database available, while the server does. For these cases, data code can be marked with an attribute to indicate where it is allowed to run (i.e., on the client, on the server, or both). At 718, the system processes the attributed code.

If the lightweight API does not exist, flow is from 710 to 714 to process server triggering events.

If the system determines that the document will be run on the client, flow is from 706 to 720 to invoke the client model by starting the data model. At 722, the view model is started. At 724, the data model is then bound to the view model. At 726, the system processes client-triggering events, as indicated hereinabove. Flow is then to 716 and 718 to process runtime exceptions and attributed code. The process then reaches a Stop block.

Data Island Transparency

There are several reasons to actually keep data separate from the document content. Keeping the data in the document content requires that each data element be mapped to a document view element, when in reality, there is often data that is desired to be maintained and manipulated but not displayed or stored in the document content. For example, an employee ID can be part of the data model but not actually displayed in the document contents or in the view model.

Another reason for separating data from content is that many modern applications have document file formats that are not transparent or are very difficult to retrieve data from if the host application is not running. Traditionally, the host application has to be run to read or modify data that is contained in the document content. This is inefficient for scenarios such as servers where a web page is accessed to quickly retrieve and display important data in a document, yet it is needed or required to start the entire host application to get the data from the document.

Developers normally want to deal directly with the data, and not have to start the host application to read data from document content. Given a schema for the data in the document, the present invention automatically separates the data from the view by generating and saving a data island in the document that conforms to the data schema created by the developer. This data schema is the same schema used to create the data model. This data island can be accessed and modified on the server without having to start the host application. Moreover, each time the document runs inside the host application, the contents of this data island are synchronized with the document contents. Additionally, the generated data model is connected to the data island so that the data model works directly against data. Changes to the data model are then moved into the document contents via the data binding mechanism to view controls described herein.

The developer may mark any data being used as "cached" by using a custom attribute. The document data can be cached by taking advantage that the document can be stored in an OLE (Object Linking and Embedding) structured storage (or document). An OLE structured storage is a standard, operating-system-provided file format that allows a file (or document) to act as a collection of directories (called "storages") and files (called "streams"). A storage is created in the document and a stream is created to hold the persisted state of the cached data. When the document customization is created on either the client or the server, the cached data is reconstituted out of the stream. The customization code can then manipulate the data, and store any changes back into the stream. It is to be appreciated by one skilled in the art that the present invention is not limited to the use of OLE structured storage documents. Other file formats can also support the insertion of a data island. For example, if the file format is XML it is easy to insert a data island in it. Even if the file format is a binary file format, if the host can provide a reader and writer to insert the data island into the binary file, that reader and writer can be used without starting up the full host application to edit the data island.

Data Binding

As indicated previously, the data and view programming models are loosely coupled using data binding whereby data elements are bound to view elements. In a scenario with no view (for example, when running the code in a server process) the view programming model is not started up and the data binding is not used. Only the data-programming model is started. The data island may be changed and the document updated. However, the contents of the document—the actual view—will not have the new state of the data, because the full host application has to be started to edit the view which is typically in a non-transparent part of the document. The changes made to the data island are moved into the view of the document the next time the document is opened by the full host application. When the document is opened by the host application, all three programming models are started, and during startup, the data binding that connects the data model to the view moves the data out of the data island into the view. In this way, the view is updated to display the latest data.

Figure 8:
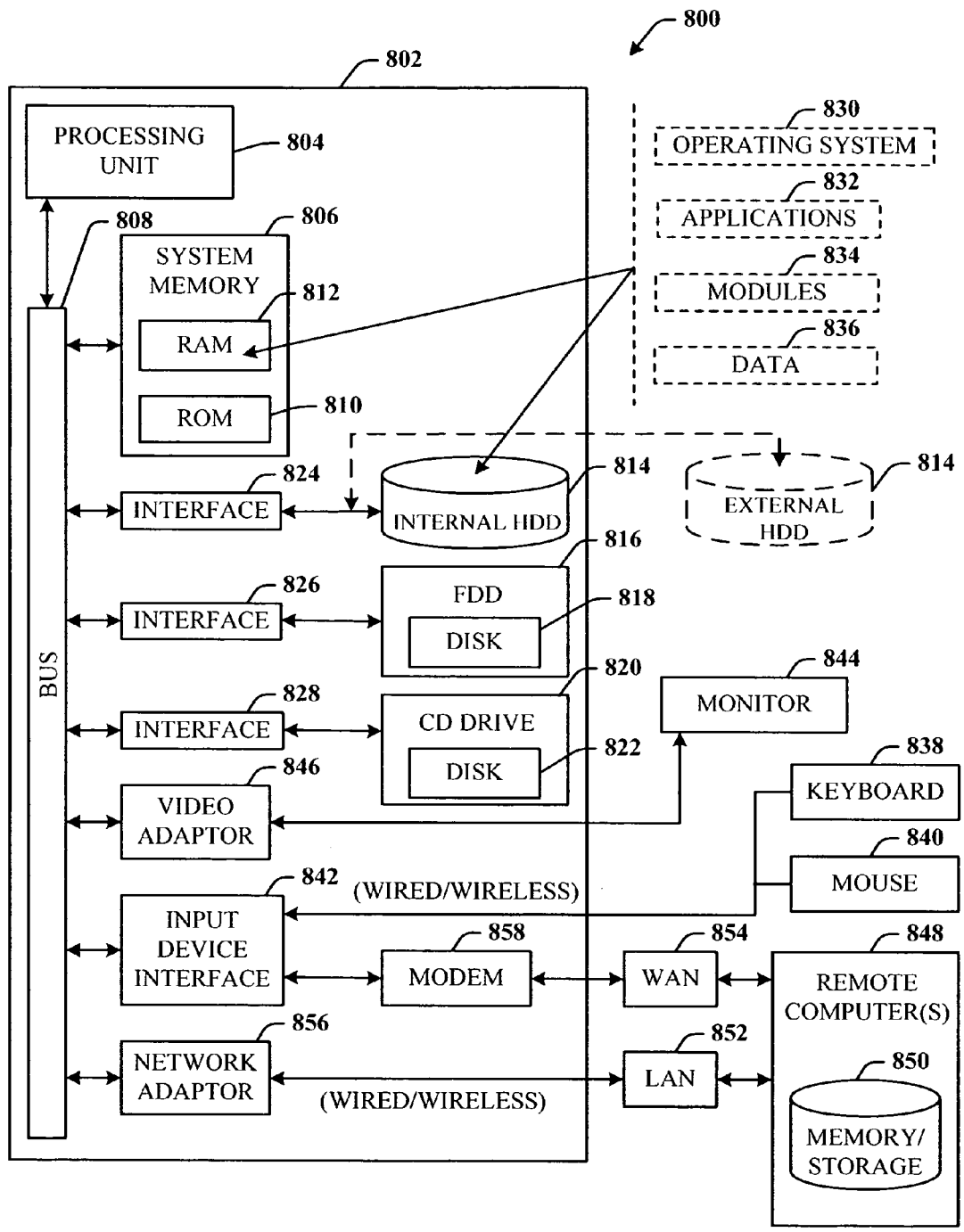
FIG. 8 illustrates a block diagram of a computer operable to execute the disclosed architecture.

Referring now to FIG. 8, there is illustrated a block diagram of a computer operable to execute the disclosed architecture. In order to provide additional context for various aspects of the present invention, FIG. 8 and the following discussion are intended to provide a brief, general description of a suitable computing environment 800 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices.

The illustrated aspects of the invention may also be practiced in distributed computing environments where certain tasks are performed by remote processing devices that are linked through a communications network. In a distributed computing environment, program modules may be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 8, there is illustrated an exemplary environment 800 for implementing various aspects of the invention that includes a computer 802, the computer 802 including a processing unit 804, a system memory 806 and a system bus 808. The system bus 808 couples system components including, but not limited to, the system memory 806 to the processing unit 804. The processing unit 804 may be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read only memory (ROM) 810 and random access memory (RAM) 812. A basic input/output system (BIOS) is stored in a nonvolatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 894 interface technologies.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the present invention.

A number of program modules can be stored in the drives and RAM 812, including an operating system 830, one or more application programs 832, other program modules 834 and program data 836. All or portions of the operating system, applications, modules, and/or data can also be cached in the RAM 812.

It is appreciated that the present invention can be implemented with various commercially available operating systems or combinations of operating systems.

A user can enter commands and information into the computer 802 through one or more wired/wireless input devices, e.g., a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but may be connected by other interfaces, such as a parallel port, an IEEE 1394 serial port, a game port, a USB port, an IR interface, etc.

A monitor 844 or other type of display device is also connected to the system bus 808 via an interface, such as a video adapter 846. In addition to the monitor 844, a computer typically includes other peripheral output devices (not shown), such as speakers, printers etc.

The computer 802 may operate in a networked environment using logical connections via wired and/or wireless communications to one or more remote computers, such as a remote computer(s) 848. The remote computer(s) 848 may be a workstation, a server computer, a router, a personal computer, portable computer, microprocessor-based entertainment appliance, a peer device or other common network node, and typically includes many or all of the elements described relative to the computer 802, although, for purposes of brevity, only a memory storage device 850 is illustrated. The logical connections depicted include wired/wireless connectivity to a local area network (LAN) 852 and/or larger networks, e.g., a wide area network (WAN) 854. Such LAN and WAN networking environments are commonplace in offices, and companies, and facilitate enterprise-wide computer networks, such as intranets, all of which may connect to a global communication network, e.g., the Internet.

When used in a LAN networking environment, the computer 802 is connected to the local network 852 through a wired and/or wireless communication network interface or adapter 856. The adaptor 856 may facilitate wired or wireless communication to the LAN 852, which may also include a wireless access point disposed thereon for communicating with the wireless adaptor 856. When used in a WAN networking environment, the computer 802 can include a modem 858, or is connected to a communications server on the LAN, or has other means for establishing communications over the WAN 854, such as by way of the Internet. The modem 858, which may be internal or external and a wired or wireless device, is connected to the system bus 808 via the serial port interface 842. In a networked environment, program modules depicted relative to the computer 802, or portions thereof, may be stored in the remote memory/storage device 850. It will be appreciated that the network connections shown are exemplary and other means of establishing a communications link between the computers may be used.

The computer 802 is operable to communicate with any wireless devices or entities operably disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication may be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10 BaseT wired Ethernet networks used in many offices.

Figure 9:
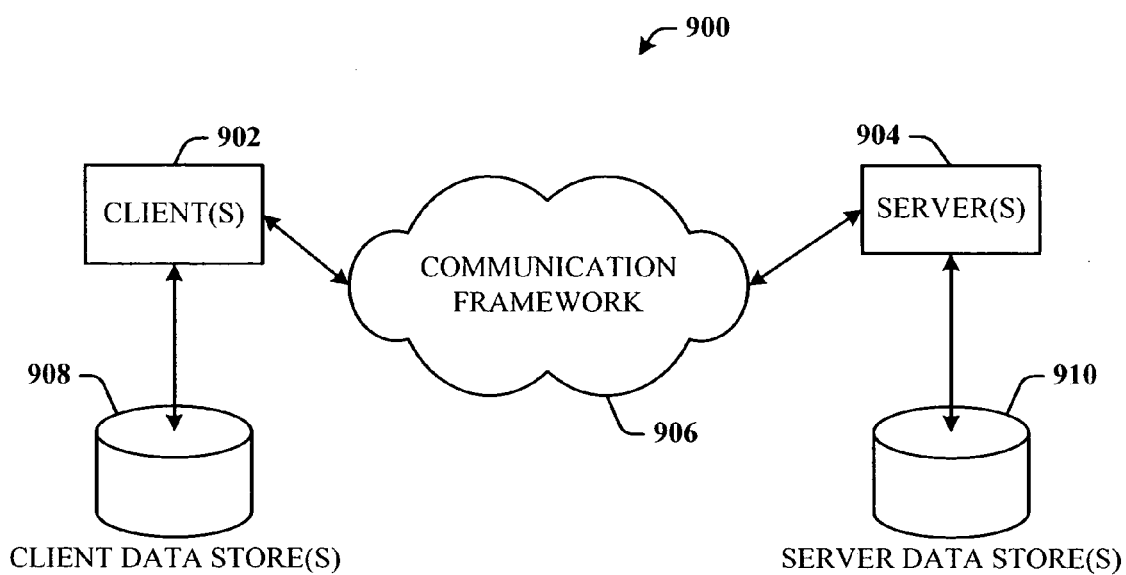
FIG. 9 illustrates a schematic block diagram of an exemplary computing environment in accordance with the present invention.

Referring now to FIG. 9, there is illustrated a schematic block diagram of an exemplary computing environment 900 in accordance with the present invention. The system 900 includes one or more client(s) 902. The client(s) 902 can be hardware and/or software (e.g., threads, processes, computing devices). The client(s) 902 can house cookie(s) and/or associated contextual information by employing the present invention, for example. The system 900 also includes one or more server(s) 904. The server(s) 904 can also be hardware and/or software (e.g., threads, processes, computing devices). The servers 904 can house threads to perform transformations by employing the present invention, for example. One possible communication between a client 902 and a server 904 may be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications may be facilitated via a wired (including optical fiber) and/or wireless technology. The client(s) 902 are operably connected to one or more client data store(s) 908 that can be employed to store information local to the client(s) 902 (e.g., cookie(s) and/or associated contextual information). Similarly, the server(s) 904 are operably connected to one or more server data store(s) 910 that can be employed to store information local to the servers 904.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system that facilitates processing of a document, comprising a processor executing following components:
   a host application that facilitates creation of the document;
   a programming component that at least one of embeds code in the document or links code to another document such that the document can be run independently of the host application;
   a data island of data generated within the document accessible by a server and a client of the server such that the data island is modified on the server without having to start the host application on the server and contents of the data are synchronized with the document contents when the document runs inside the host application; and
   a data model that is connected to the data island to work directly against data of the data island, and changes to the data model are moved into the document contents via data binding.

2. The system of claim 1, the document runs on the client and the server.

3. The system of claim 1, the programming component separates document information into data content and view content.

4. The system of claim 3, the view content maps programmable names to generic API (Application Program Interface) objects, which objects are exposed as view controls that can be programmed against.

5. The system of claim 3, the data content acts indirectly against the view content via the data binding.

6. The system of claim 1, the data island in the document conforms to a predetermined data schema and can be edited without the full host application running.

7. The system of claim 1, the programming component is event based such that the code runs according to an event that is related to the client or the server.

8. The system of claim 1 generates a runtime exception when a system error occurs.

9. The system of claim 1 controls permissions associated with the document according to whether the document is running on the client or the server.

10. The system of claim 1, the code includes data code portions of which are attributed to indicate if the corresponding data can be run on the client, the server, or both.

11. A computer according to the system of claim 1.

12. A computer implemented system that facilitates processing of a document, comprising a processor executing the following components:
    a host application that facilitates creation of the document; and a data component that facilitates creation of a data island that is at least one of embedded in the document or linked to from another document such that the document can be run with only a subset of all components of the host application on both a client and a server, wherein the data island conforms to a data schema associated with the document, the data island is edited by running only a subset of components of the host application without having to start the host application and the data island is synchronized with document contents when the document is run inside the host application; and a data model that is connected to the data island to work directly against data of the data island, and changes to the data model are moved into the document contents via a data binding mechanism.

13. The system of claim 12, data of the data island can be cached by marking the data using an attribute.

14. The system of claim 12, the document is one of an OLE structured document, an XML file, and a binary file that facilitates storing a persisted state of cached data, wherein if the document is a binary file, a reader/writer of the host application can be employed to insert the data island into the binary file and which reader/writer can be used to edit the data island.

15. The system of claim 14, when the OLE document is processed on either a client or a server, the cached data can be reconstituted out of the OLE document, manipulated, and changes to the cached data stored back into the OLE document.

16. A computer readable storage medium having stored thereon the following computer executable components:

a host application that facilitates creation of the document;

a programming component that at least one of embeds code in the document or links code to another document such that the document can be run independently of the host application;

a data island of data generated within the document accessible by a server and a client of the server such that the data island is modified on the server without having to start the host application on the server and contents of the data are synchronized with the document contents when the document runs inside the host application; and a data model that is connected to the data island to work directly against data of the data island, and changes to the data model are moved into the document contents via a data binding mechanism.

* * * * *